(12) United States Patent
Oguchi

(10) Patent No.: US 9,889,492 B2
(45) Date of Patent: Feb. 13, 2018

(54) BEAD RING WINDER AND SETTING MEMBER

(75) Inventor: Hiroshi Oguchi, Hashima (JP)

(73) Assignees: Fuji Seiko Co., Ltd. (JP); Fuji Shoji Co., Ltd. (JP)

( * ) Notice: Subject to any disclaimer, the term of this patent is extended or adjusted under 35 U.S.C. 154(b) by 465 days.

(21) Appl. No.: 14/408,204

(22) PCT Filed: Jun. 19, 2012

(86) PCT No.: PCT/JP2012/065611
§ 371 (c)(1),
(2), (4) Date: Mar. 17, 2015

(87) PCT Pub. No.: WO2013/190634
PCT Pub. Date: Dec. 27, 2013

(65) Prior Publication Data
US 2015/0217362 A1    Aug. 6, 2015

(51) Int. Cl.
*B29D 30/48* (2006.01)
*B21F 37/00* (2006.01)

(52) U.S. Cl.
CPC .............. *B21F 37/00* (2013.01); *B29D 30/48* (2013.01); *B29D 2030/487* (2013.01)

(58) Field of Classification Search
CPC .............. B29D 30/48; B29D 2030/487; B29D 2030/488
See application file for complete search history.

(56) References Cited

U.S. PATENT DOCUMENTS 833,007 A * 10/1906 Slick .......................... E01B 9/66
238/338
1,097,185 A * 5/1914 Oehrle .................. F16B 41/002
279/6

(Continued)

FOREIGN PATENT DOCUMENTS

| BY | 5466 C1 | 9/2003 |
| JP | 54-119579 | 9/1979 |
| JP | 09-267410 | 10/1997 |

(Continued)

OTHER PUBLICATIONS

Machine translation of JP 54-119579A, patent document published Sep. 17, 1979.*

(Continued)

*Primary Examiner* — Geoffrey L Knable
(74) *Attorney, Agent, or Firm* — Tarolli, Sundheim, Covell & Tummino LLP

(57) ABSTRACT

The bead ring winder winds a cord around the circumference of a former by rotating a rotation shaft to form a bead ring. The former includes a fixed segment, which is fixed to the rotation shaft, and a separated segment, which is coupled to the fixed segment to be movable toward and away from the fixed segment, so that the former is configured to be able to increase and decrease the circumference length of the former. The bead ring winder includes a setting member, which can be replaced to set a separated distance of the separated segment from the fixed segment when changing the winding diameter of a bead ring to be formed, and a fastening plate and a fastening bolt, which fasten the separated segment to the fixed segment.

3 Claims, 5 Drawing Sheets

(56) References Cited

U.S. PATENT DOCUMENTS 2,083,350 A * 6/1937 Shook .................... B29D 30/48
140/92.2
2,151,306 A 3/1939 Shook

FOREIGN PATENT DOCUMENTS

RU 2005620 C1 1/1994
WO WO 97/28957 A1 8/1997

OTHER PUBLICATIONS

Russian Office Action for Application No. 2015101112 dated Apr. 15, 2016.
Translation of the International Preliminary Report on Patentability, dated Dec. 23, 2014, pp. 1-6.
International Search Report for corresponding PCT/JP2012/065611, completed on Aug. 27, 2012 in the JPO.

* cited by examiner

BEAD RING WINDER AND SETTING MEMBER

RELATED APPLICATIONS

The present invention is a U.S. National Stage under 35 USC 371 patent application, claiming priority to Serial No. PCT/JP2012/065611, filed on 19 Jun. 2012, the entirety of which is incorporated herein by reference.

TECHNICAL FIELD

The present invention relates to a bead ring winder that winds a cord around the circumference of a former to form a bead ring.

BACKGROUND ART

A conventional bead ring winder of such a type rotates a rotation shaft, which supports a former, to wind a cord around the circumference of the former and form a bead ring having a predetermined winding diameter, which corresponds to the diameter of the former.

In such a structure, for example, as described in Patent Document 1, segments are arranged on a circular former to change the winding diameter of a bead ring to be formed. The segments are movable in the radial direction of the former. A bead ring having a diameter in accordance with the positions of the segments is formed.

PRIOR ART DOCUMENT

Patent Document 1: Japanese Laid-Open Patent Publication No. 9-267410

SUMMARY OF THE INVENTION

Problems that are to be Solved by the Invention

The conventional bead ring wider, however, needs a mechanism that guides the movement of the segments in the radial direction and a mechanism that positions the segments at certain locations. This results in a complicated structure.

Accordingly, it is an object of the present invention to provide a bead ring winder that simplifies the structure of a former used to change the winding diameter of a bead ring to be formed and allows for such changes to be easily performed.

Means for Solving the Problems

To achieve the above object, one aspect of the present invention provides a bead ring winder that winds a cord around the circumference of a former by rotating a rotation shaft to form a bead ring. The former includes a fixed segment, which is fixed to the rotation shaft, and a separated segment, which is coupled to the fixed segment to be movable toward and away from the fixed segment, so that the former is configured to be able to increase and decrease the circumferential length of the former. The bead ring winder includes a setting member, which can be replaced to set a separated distance of the separated segment from the fixed segment when changing the winding diameter of a bead ring to be formed, and a fastening member, which fastens the separated segment to the fixed segment.

Accordingly, in the bead ring winder of the present invention, when changing the winding diameter of a bead ring to be formed, the setting member may be replaced with a setting member that sets the separated distance of the separated segment in accordance with the winding diameter of the bead ring.

In the above structure, the separated segment may be formed by two separated segments pivotally connected to two sides of the fixed segment. The setting member may include two engaging portions that can be engaged with engaged portions on the two separated segments. The setting member may be replaceable with another setting member having a different interval between the engaged portions.

In the above structure, the setting member may have a front surface including an indicator that indicates information related to the winding diameter of a bead ring to be set by the setting member.

Another aspect of the present invention provides a setting member for use with the bead ring winder of the above aspect. The setting member includes two engaging portions that can be engaged in a concavo-convex relationship with engaged portions on the separated segment of the bead ring winder. Engagement of the engaging portions with the engaged portions sets a separated distance of the separated segment from the fixed segment of the bead ring winder.

Preferably, the setting member has a front surface including an indicator that indicates information related to the winding diameter of a bead ring.

Effects of the Invention

As described above, the present invention succeeds in easily and accurately adjusting and setting the separated distance of the separated segment from the fixed segment of the former when changing the winding diameter of a bead ring to be formed.

MODES FOR CARRYING OUT THE INVENTION

First Embodiment

A first embodiment of the present invention will now be described with reference to FIGS. 1 to 5(*c*).

Figure 1:
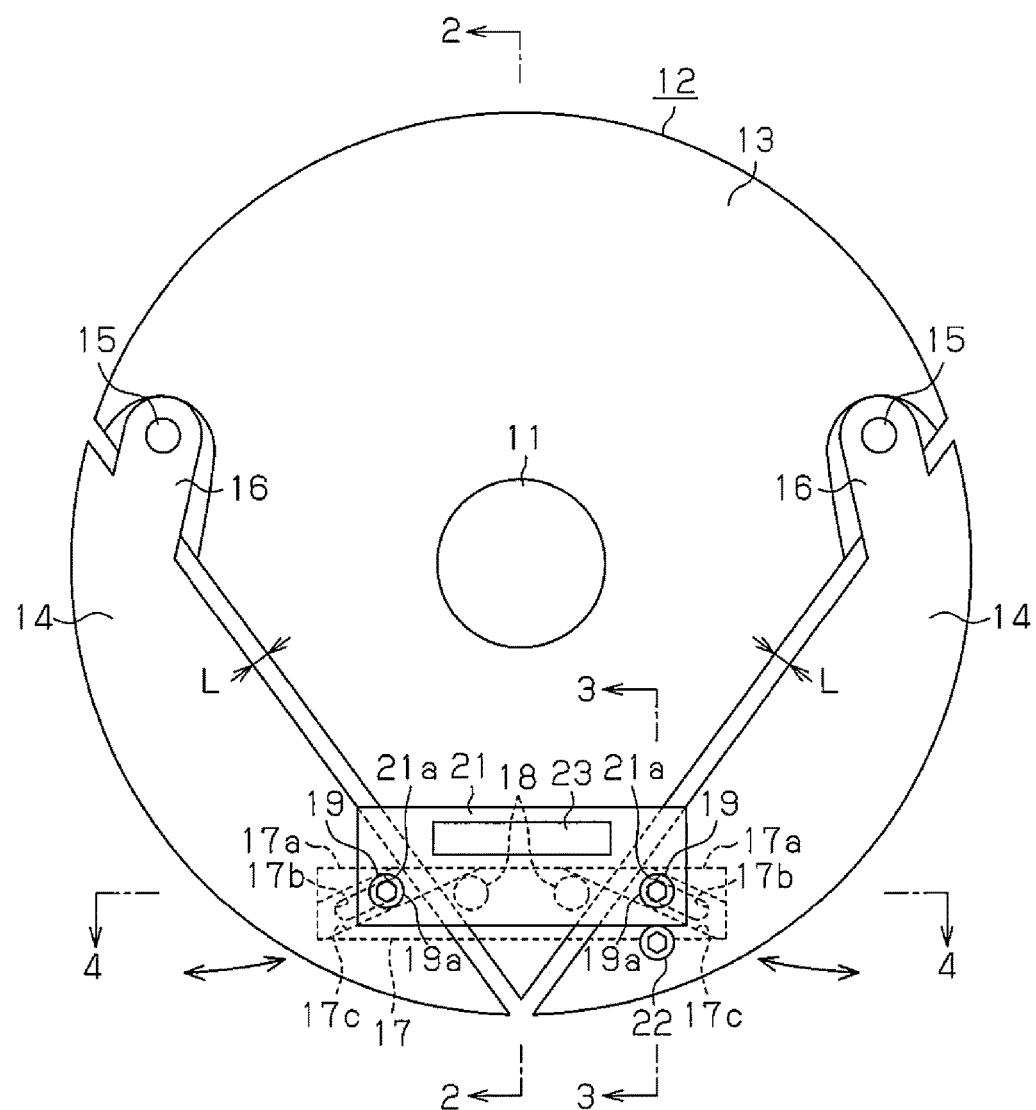
FIG. 1 is a front view showing a former of a bead ring winder according to a first embodiment of the present invention.
Figure 2:
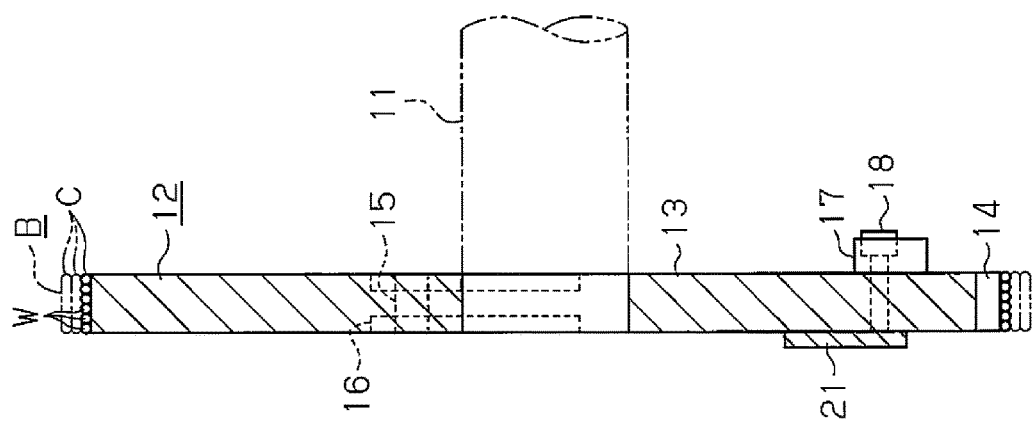
FIG. 2 is a vertical cross-sectional view taken along line 2-2 in FIG. 1.

As shown in FIGS. 1 and 2, a bead ring winder includes a frame (not shown) that rotatably supports a rotation shaft 11. The rotation shaft 11 supports a former 12, which is substantially circular as a whole. The rotation of the rotation shaft 11 winds a cord C into rows around the circumference of the former 12 to form a bead ring B. The cord C is formed into the shape of a ribbon as a whole by arranging wires W in order and then insulating them with rubber.

As shown in FIGS. 1 and 2, the former 12 includes a fixed segment 13, which is fixed to the rotation shaft 11, and separated segments 14, which are coupled to the fixed segment 13 so as to be movable toward and away from the fixed segment 13. In this embodiment, two separated segments 14 are each pivotally coupled to one of opposite sides of the fixed segment 13 by a pivot shaft 15 and a coupling plate 16. The separated distance L of the separated segments 14 from the fixed segment 13 is changed to increase or decrease the circumferential length of the former 12.

Figure 3:
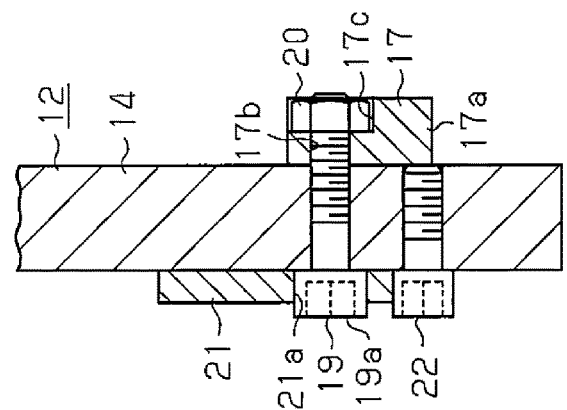
FIG. 3 is an enlarged partial cross-sectional view taken along line 3-3 in FIG. 1.
Figure 4:
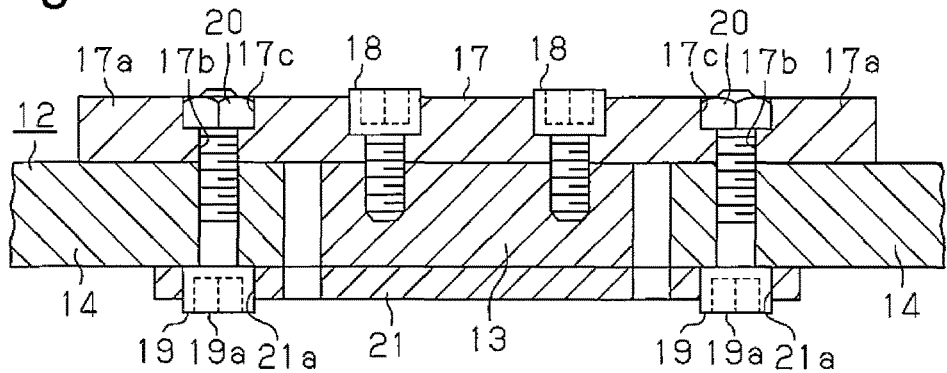
FIG. 4 is an enlarged partial cross-sectional view taken along line 4-4 in FIG. 1.

As shown in FIGS. 1, 3, and 4, a fastening plate 17, which forms a fastening member, is fastened by two bolts 18 to a free end of the fixed segment 13 at the rear surface of the former 12. Extensions 17a extend toward the separated segments 14 from opposite sides of the fastening plate 17. The two extensions 17a of the fastening plate 17 each include an arcuate elongated hole 17b extending about the pivot shaft 15 of the corresponding separated segment 14. A rear surface of the extensions 17a of the fastening plate 17 each include a groove 17c, which extends in the extending direction of the corresponding elongated hole 17b and which is in communication with the elongated hole 17b.

As shown in FIGS. 1, 3, and 4, in each separated segment 14, a fastening bolt 19, which forms the fastening member, is inserted through a hole in the separated segment 14 from the front side of the separated segment 14 and located in the corresponding elongated hole 17b of the fastening plate 17. A nut 20, which forms the fastening member, is fastened to a distal threaded portion of the fastening bolt 19 in the corresponding groove 17c of the fastening plate 17. Rotation of the nut 20 is restricted in the groove 17c. The nut 20 is tightened to the corresponding fastening bolt 19 with the separated segments 14 set at a certain separated distance L from the fixed segment 13. This fixes the separated segments 14 in the set state. When adjusting and setting the separated distance L of the separated segments 14 from the fixed segment 13, the fastening bolts 19 are loosened and the separated segments 14 are then pivoted. This moves each fastening bolt 19 along the corresponding elongated hole 17b and moves each nut 20 in the corresponding groove 17c.

Figure 5A:
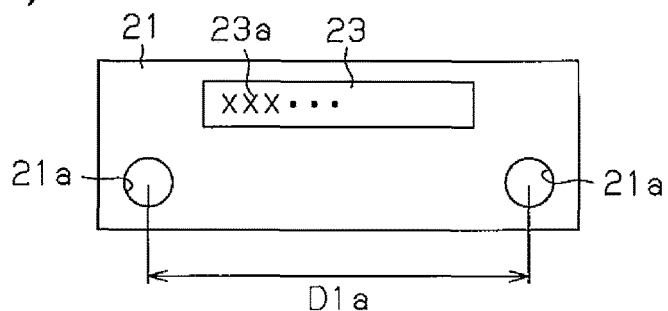
FIGS. 5(*a*), 5(*b*), and 5(*c*) are enlarged front views showing different types of setting members used for the former of FIG. 1.
Figure 5B:
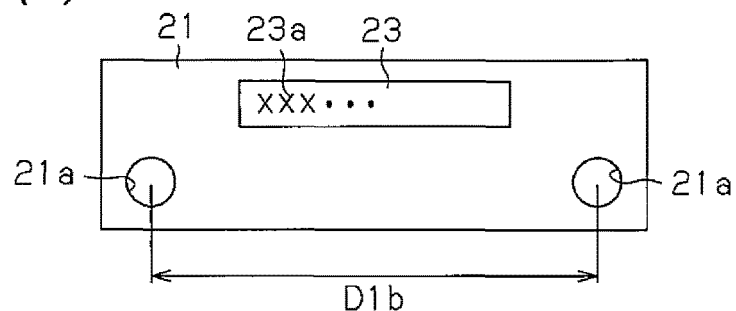
Figure 5C:
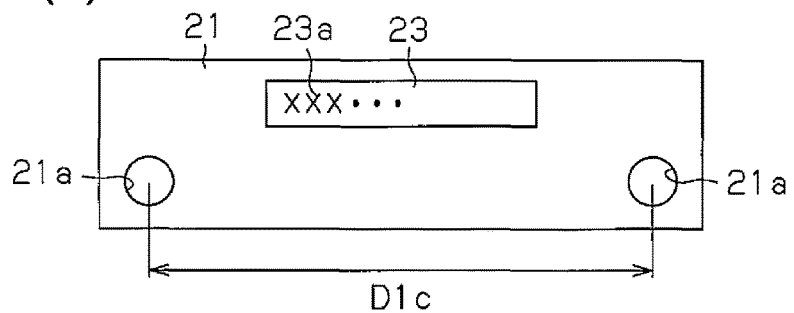
Figure 6:
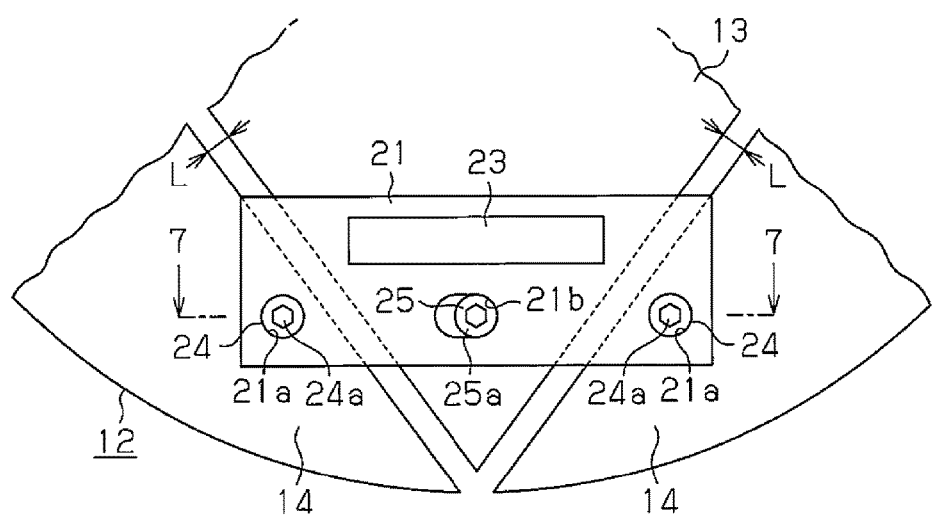
FIG. 6 is a front view showing a main portion of a former of a bead ring winder according to a second embodiment of the present invention.
Figure 7:
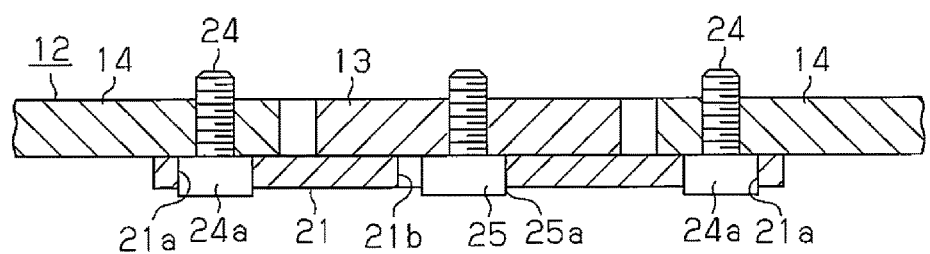
FIG. 7 is an enlarged partial cross-sectional view taken along line 7-7 in FIG. 6.

As shown in FIGS. 1 to 4, a replaceable setting member 21, which is used to set the separated distance L of the separated segments 14 from the fixed segment 13, is coupled in a removable manner between free ends of the separated segments 14 at the front surface of the former 12. The setting member 21 is replaced when changing the winding diameter of a bead ring B to be formed. Two holes in two sides of the setting member 21 define engaging portions 21a that can be fitted onto and engaged with engaged portions 19a, which are defined by the heads of the fastening bolts 19 on the separated segments 14. For example, as shown in FIGS. 5(a) to 5(c), a plurality of setting members 21 are prepared in correspondence with the winding diameters of a bead rings B to be formed, and different intervals D1a, D1b, and D1c between the engaging portions 21a are set for the setting members 21. Engagement of the engaging portions 21a of the setting member 21 with the engaged portions 19a sets the separated segments 14 at a predetermined separated distance L from the fixed segment 13.

As shown in FIGS. 1 and 3, an eccentric bolt 22, which has an eccentric head, is rotatably fastened to a front surface of one of the separated segments 14 proximate to the setting member 21. The eccentric bolt 22 is rotated when the engaging portions 21a of the setting member 21 are engaged with the engaged portions 19a on the separated segments 14 so that the eccentric head of the eccentric bolt 22 is pressed against the lower edge of the setting member 21. This holds and fixes the setting member 21 between the front surfaces of the separated segments 14.

As shown in FIGS. 1 and 5(a) to 5(c), the front surface of the setting member 21 includes an indicator 23 that indicates information 23a related with the type of the former 12, the winding diameter of a bead ring B to be set by the setting member 21, the separated distance L of the separated segments 14 from the fixed segment 13, and the like. When changing the winding diameter of a bead ring B to be formed, a setting member 21 that corresponds to the winding diameter of that bead ring B is selected based on the information 23a indicated on the indicator 23 and coupled between the separated segments 14.

The operation of the bead ring winder will now be described.

When increasing or decreasing the circumferential length of the former 12 to change the winding diameter of a bead ring B to be formed by the bead ring winder, the eccentric bolt 22 is loosened with a hexagonal wrench or the like to release the pressure applied to the setting member 21. Under this condition, the setting member 21 is removed from between the front surfaces of the separated segments 14.

Then, the setting member 21 corresponding to the winding diameter of a bead ring B to be formed is selected based on the information 23a indicated on the indicator 23. Further, while pivoting the separated segments 14 to change the separated distance L of the separated segments 14 from the fixed segment 13, the engaging portions 21a, which are formed by the holes at the two sides of the setting member 21, are engaged with the engaged portions 19a, which are formed by the heads of the fastening bolts 19 on the separated segments 14. This sets the separated segments 14 relative to the fixed segment 13 at a predetermined separated distance L in correspondence with the winding diameter of a bead ring B to be formed.

Then, the fastening bolts 19 are tightened to fix and set the separated segments 14. Further, the eccentric bolt 22 is rotated so that the head of the eccentric bolt 22 presses the lower end of the setting member 21. This holds and fixes the setting member 21 between the front surfaces of the separated segments 14. In this manner, the setting member 21 that corresponds to the winding diameter of the bead ring B is selected and coupled between the separated segments 14. This easily changes the separated distance L of the separated segments 14 from the fixed segment 13 and allows the circumferential length of the former 12 to be increased or decreased.

The present embodiment has the advantages described below.

(1) In this embodiment, the former 12 includes the fixed segment 13, which is fixed to the rotation shaft 11, and the separated segments 14, which are coupled to the fixed segment 13 so as to be movable toward and away from the fixed segment 13. This allows the circumferential length of the former 12 to be increased and decreased. Further, the former 12 includes the replaceable setting member 21, which is used to set the separated distance L of the separated segments 14 from the fixed segment 13, the fastening plate 17, the fastening bolts 19, and the nuts 20, which fasten the separated segments 14 to the fixed segment 13 in the set state.

Thus, the winding diameter of a bead ring B to be formed may be changed by replacing the setting member 21 with a setting member 21 that sets the separated distance L of the separated segments 14 in correspondence with the winding diameter of the bead ring B and then fixing the separated segments 14 with the eccentric bolt 22. Therefore, in comparison with when an operator manually adjusts the separated distance of the separated segments from the fixed segment while visually checking the separated distance, the adjustment of the separated distance L of the separated segments 14 can be easily and accurately performed to change the winding diameter of a bead ring B to be formed.

The structure for changing the winding diameter of the bead ring B only includes the setting member 21 as a main member. Thus, the structure can be simplified without increasing the number of components.

(2) In the present embodiment, the setting member 21 includes the two engaging portions 21a, which can be engaged with the engaged portions 19a of the two separated segments 14. Further, the setting members 21 have different intervals D1a, D1b, and D1c between the engaging portions 21a. Thus, the coupling of a single setting member 21 readily and accurately adjusts the separated distance L of the two separated segments 14 from the fixed segment 13 to the desired value.

(3) In this embodiment, the front surface of the setting member 21 includes the indicator 23, which indicates the information 23a related to the winding diameter of a bead ring B to be set by the setting member 21. Thus, based on the indication of the indicator 23 on the setting member 21, the setting member 21 can be correctly selected and coupled in correspondence with the winding diameter of the bead ring B.

(4) In the present embodiment, the fixed segment 13 includes the fastening plate 17, and the fastening plate 17 includes the elongated holes 17b, which the fastening bolts 19 are inserted into and which extend in the pivoting direction of the separated segments 14 about the pivot shaft 15. One of the separated segments 14 includes the eccentric bolt 22 that is pressed against the lower edge of the setting member 21. Accordingly, when the setting member 21 is supported by the fastening bolts 19 and pressed by the eccentric bolt 22, the setting member 21 is maintained substantially horizontal. This sets the separated segments 14 on opposite sides of the fixed segment 13 at symmetric positions and forms a bead ring having subtle distortion.

Second Embodiment

A second embodiment of the present invention will now be described focusing on differences from the first embodiment.

In the second embodiment, as shown in FIGS. 6 to 8(c), the fastening plate 17, which serves as a fastening member in the first embodiment, is omitted, and the setting member 21 also functions as a fastening member. Coupling bolts 24 are fastened and fixed from the front side to threaded holes in the free ends of the separated segments 14. Each coupling bolt 24 includes a head 24a that forms an engaged portion that can be engaged with a corresponding engaging portion 21a, which is formed by a hole in the setting member 21. The engaging portion 21a is engaged in a removable manner with the head 24a. This holds the setting member 21 between the separated segments 14.

An eccentric bolt 25, which serves as the fastening member, is fastened from the front side to a threaded hole in the fixed segment 13 between the coupling bolts 24. The eccentric bolt 25 includes a head 25a that is eccentric. A middle portion of the setting member 21 includes an engaging hole 21b that is used to position the setting member 21 and engaged with the head 25a of the eccentric bolt 25. More specifically, the eccentric bolt 25 is rotated so that the eccentric head 25a is pressed against and engaged with the wall surface of the engaging hole 21b to fix the setting member 21. This engagement of the eccentric bolt 25 with the engaging hole 21b positions the setting member 21 relative to the fixed segment 13. Thus, the separated segments 14 are set at symmetric positions on opposite sides of the fixed segment 13.

Figure 8A:
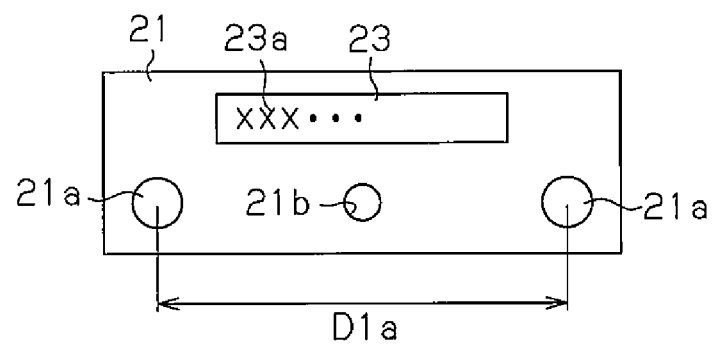
FIGS. 8(*a*), 8(*b*), and 8(*c*) are front views showing different types of setting members used for the former of FIG. 6.
Figure 8B:
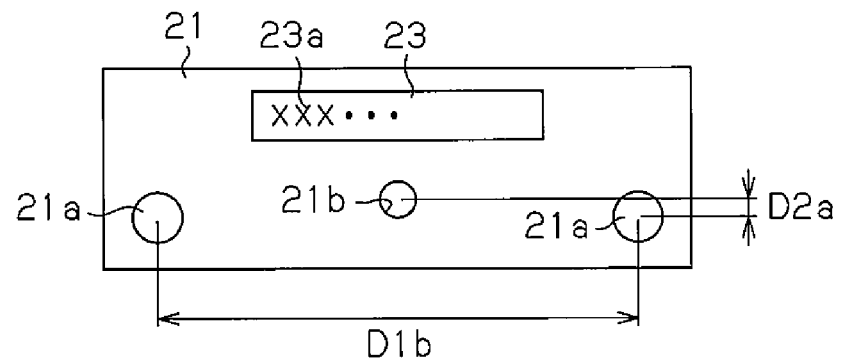
Figure 8C:
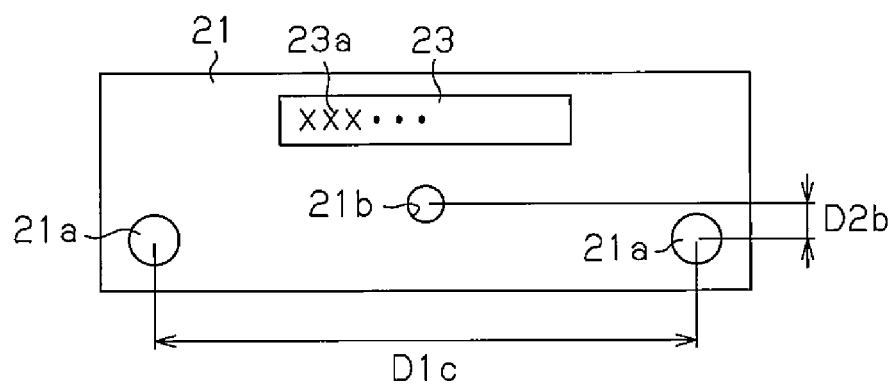

As shown in FIGS. 8(a) to 8(c), a plurality of setting members 21 are prepared in correspondence with the winding diameters of bead rings B to be formed. The setting members 21 are formed to have different intervals D1a, D1b, and D1c between the engaging portions 21a and different intervals D2a and D2b between the engaging portion 21a and the engaging hole 21b.

When changing the winding diameter of a bead ring B to be formed by the bead ring winder, the head 25a of the eccentric bolt 25 releases the pressure applied to the setting member 21. Then, the setting member 21 is removed from the head 24a of the coupling bolt 24 and replaced with another one. This allows the separated distance L of the separated segments 14 from the fixed segment 13 to be changed and set.

In addition to advantages (1) to (4) of the first embodiment, the second embodiment has the following advantage.

(5) The present embodiment does not need the fastening plate 17 on the rear surface of the fixed segment 13. This simplifies the structure.

Modified Example

The above embodiments may be modified as described below.

For example, the number of the separated segments 14 may be one or three or greater. When there is only one separated segment 14, only one bolt 18 and one engaged portion 19a of the setting member 21 for the fastening bolt 19 is necessary. When there are three or more separated segments 14, a setting member 21 is arranged between the fixed segment 13 and each of the separated segments 14.

DESCRIPTION OF THE REFERENCE CHARACTERS

11: rotation shaft, 12: former, 13: fixed segment, 14: separated segment, 17: fastening plate forming fastening member, 19: fastening bolt forming fastening member, 19a and 19b: engaged portions, 20: nut forming fastening member, 21: setting member, 21a: engaging portion, 23: indicator, 23a: information, 24: eccentric bolt forming fastening member, C: cord, B: bead ring, L: separated distance, D1a, D1b, and D1c: intervals.

The invention claimed is:

1. A bead ring winder that winds a cord around a circumference of a former by rotating a rotation shaft to form a bead ring,
wherein the former includes a fixed segment, which is fixed to the rotation shaft, and a separated segment, which is coupled to the fixed segment to be movable toward and away from the fixed segment, so that the former is configured to be able to increase and decrease a circumferential length of the former, the bead ring winder further comprising a setting member, which can be replaced to set a separated distance of the separated segment from the fixed segment when changing a winding diameter of a bead ring to be formed, and a fastening member, which fastens the separated segment to the fixed segment, the fastening member being an eccentric bolt, the eccentric bolt passing through an engaging hole in the setting member and fastened to a threaded hole in the fixed segment such that a head of the eccentric bolt is engaged with a wall surface of the engaging hole to position and fix the setting member.

2. The bead ring winder according to claim 1, wherein the separated segment is formed by two separated segments pivotally connected to two sides of the fixed segment, the setting member includes two engaging portions that can be engaged with engaged portions on the two separated segments; and the setting member is replaceable with another setting member having a different interval between the engaged portions.

3. The bead ring winder according to claim 1, wherein the setting member has a front surface including an indicator that indicates information related to the winding diameter of a bead ring to be set by the setting member.

\* \* \* \* \*